(12) United States Patent
Nho et al.

(10) Patent No.: US 8,029,754 B2
(45) Date of Patent: Oct. 4, 2011

(54) CERIUM OXIDE POWDER AND PROCESS FOR PRODUCING THE SAME

(75) Inventors: Jun-seok Nho, Daejeon (KR); Jang-yul Kim, Daejeon (KR); Myoung-hwan Oh, Daejeon (KR); Jong-pil Kim, Daejeon (KR); Seung-beom Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/557,356

(22) PCT Filed: Jul. 28, 2005

(86) PCT No.: PCT/KR2005/002459
§ 371 (c)(1),
(2), (4) Date: Nov. 17, 2005

(87) PCT Pub. No.: WO2006/011764
PCT Pub. Date: Feb. 2, 2006

(65) Prior Publication Data
US 2008/0132403 A1    Jun. 5, 2008

(30) Foreign Application Priority Data
Jul. 29, 2004    (KR) .................. 10-2004-0059777

(51) Int. Cl.
*C01F 17/00* (2006.01)
(52) U.S. Cl. ........ 423/263; 423/598; 423/608; 423/610; 423/625; 423/593
(58) Field of Classification Search .................. 423/263
See application file for complete search history.

(56) References Cited

U.S. PATENT DOCUMENTS

| | | | |
|---|---|---|---|
| 5,750,090 A * | 5/1998 | Yoshida et al. | 424/59 |
| 6,030,914 A * | 2/2000 | Matsui | 501/103 |
| 6,120,571 A * | 9/2000 | Aihara et al. | 51/309 |
| 6,503,475 B1 * | 1/2003 | McCormick et al. | 423/592.1 |
| 7,473,408 B2 * | 1/2009 | Noh et al. | 423/263 |
| 2003/0136686 A1 * | 7/2003 | Herbst | 205/751 |
| 2003/0228248 A1 * | 12/2003 | Kwon et al. | 423/263 |
| 2006/0150526 A1 * | 7/2006 | Ota et al. | 51/307 |

FOREIGN PATENT DOCUMENTS

| DE | 12 76 847 | 9/1968 |
|---|---|---|
| GB | 1 110 290 | 4/1968 |
| KR | 10-2001-7014923 | 2/2002 |
| WO | WO03/089374 | * 10/2003 |

OTHER PUBLICATIONS

Hsu, et al. "Preparation and Properties of Monodispersed Colloidal Particles of Lanthanide Compounds. 2. Cerium (IV)"; 1988 American Chemical Society; Langmuir 1988, 4, 31-37.

(Continued)

*Primary Examiner* — Melvin Mayes
*Assistant Examiner* — Smita Patel
(74) *Attorney, Agent, or Firm* — McKenna Long & Aldridge LLP (57) ABSTRACT

The present invention relates to cerium oxide powder and a process for producing the same. The cerium oxide powder of the invention, which is produced by mixing a cerium source such as cerium oxide, cerium hydroxide and cerium carbonate with an alkali metal compound, as flux, and performing high temperature treatment, may have a variety particle size while having spherical shape.

3 Claims, 8 Drawing Sheets

OTHER PUBLICATIONS

Tsuzuki, et al. "Synthesis of Ultrafine Ceria Powders by Mechanochemical Processing"; J. Am. Ceram. Soc., 84[7] 1453-58 (2001).

Bondioli et al., "Nanosized $CeO_2$ Powders Obtained by Flux Method", Materials Research Bulletin, vol. 34, Nos. 14/15, 1999, pp. 2159-2166.

* cited by examiner

CERIUM OXIDE POWDER AND PROCESS FOR PRODUCING THE SAME

This application claims priority to PCT/KR2005/002459 filed on Jul. 28, 2005, and Korean Application No. 10-2004-0059777 filed Jul. 29, 2004, in Korea, all of which are hereby incorporated by reference in their entirety.

TECHNICAL FIELD

The present invention relates to cerium oxide powder and a process for producing the same, more particularly to spherical cerium oxide powder cerium oxide with a variety of size obtained by mixing an alkali metal compound as flux with a cerium source like cerium oxide, cerium hydroxide or cerium carbonate and thermally treating the mixture and a process for producing the same.

BACKGROUND ART

Cerium oxide is a high-functional ceramic material widely used for catalysts, phosphors, cosmetics, abrasives, etc. With the advent of the STI process in the semiconductor device field, it is drawing attention as inorganic abrasive, the key material of the slurry used in the next-generation chemical mechanical polishing (hereunder referred to as "CMP") process.

Properties required for the CMP slurry used in the STI CMP process are removal rate of the silicon oxide film, selectivity between the silicon oxide film and the silicon nitride film, low scratch production of the polished surface, etc. To obtain such a slurry, the cerium oxide powder, or the abrasive, should have ideal particle size, shape, oxidation property, crystallinity, strength, etc.

High temperature solid state method is a method for synthesizing new material through decomposition of volatile substance such as carbonate or thermal reaction of different materials by heating near the melting point to increase atomic activity.

Powder synthesis by high temperature solid state method is limited in that particle growth is difficult to control, depending on composition, particle size, coagulation status, impurity composition and content, etc. For example, materials including carbonate are decomposed in the temperature range of 700-1000° C. In the process of decomposition and emission of carbon dioxide, distance between particles increases and particle shape is not controlled. As a result, particle growth or shape control is limited.

In high temperature treatment of ceramic materials, a material having a lower melting temperature is often used as flux in order to reduce sintering temperature and obtain fine particles. The flux offers a liquid phase at a temperature lower than the melting temperature of the main material, thereby improving inter-particle contact and facilitating melting of the main material sintering, which makes material transfer easier.

There were reports on synthesis of cerium oxide powder by high temperature treatment of cerium salts (cerium carbonate, cerium chloride, cerium sulfate, cerium hydroxide, etc.). However, in most cases, high temperature treatment was performed for the simple purpose of phase transition to cerium oxide. Thus, control of particle shape or size was limited.

According to the conventional synthesis method of cerium oxide proposed by Matijevic et al., raw materials such as $Ce(SO_4)_2 4H_2O$, $(NH_4)_4Ce(SO_4)_2 2H_2O$, $(NH_4)_2Ce(NO_3)_6$, and so forth are sealed in a Pyrex tube and heated to a predetermined temperature to precipitate cerium hydroxide. Then, it is calcined at about 600° C. to obtain particles in the form of hexagonal plate or sphere (Wan Peter Hsu, Lena Roannquist, Egon Matijevic, "Preparation and Properties of Monodispersed Colloidal Particles of Lanthanide Compounds. 2. Cerium(IV)," *Langmuir*, 4, 31-37 (1988)).

With the technique reported in this paper, control of particle shape and size is possible at very low concentration. However, at high concentration, because mixture crystal of needle-shaped cerium hydroxide and cerium sulfate is obtained, shape control is difficult. Besides, productivity is also low. Moreover, the resulting powders are present as hydrates of a size of several nanometers, which makes shape maintenance during high temperature treatment very difficult.

Takuya Tsuzuki et al. synthesized nano-sized uniform cerium oxide particles using cerium chloride ($CeCl_3$) and sodium hydroxide (NaOH) through mechanochemical and calcination processes. They reported that cerium hydroxide can be synthesized by mechanochemical reaction by crushing cerium chloride adding sodium hydroxide (NaOH) and sodium chloride (NaCl) with a steel ball, and that spherical, nano-sized cerium oxide particles are obtained by calcining the cerium hydroxide at a temperature of 500° C. or higher (Takuya Tsuzuki, Paul G. McCormick, "Synthesis of Ultrafine Ceria Powders by Mechanochemical Processing," *J. Am. Ceram. Soc.*, 84(7), 1453-58, (2001)).

Since this technique has to use excess sodium chloride (NaCl) as spacer in the calcination process to control particle coagulation, washing off of the sodium chloride is difficult. Also, coagulation control is impossible at a temperature higher than the sublimation temperature of sodium chloride. And, only cerium chloride ($CeCl_3$) can be used as starting material.

According to the synthesis method of cerium oxide used as abrasive material for CMP slurry, which was invented by Hitachi Chemical of Japan, (Korean Patent Application No. 10-2001-7014923), cerium salts (cerium carbonate, cerium sulfate, cerium oxalate) are baked in a rotary kiln at 600-1000° C. to obtain cerium oxide powder, which is crushed using a jet mill or a beads mill to prepare a cerium oxide abrasive.

In this technique, very tiny sintered particles (several nanometers) with weak strength are synthesized to reduced scratch during the CMP process. Consequently, particle shape is quite non-uniform and particle size is also impossible during the thermal treatment process.

DISCLOSURE OF INVENTION

It is an object of the present invention to provide cerium oxide powder which is prepared by mixing a cerium source with an alkali metal compound, as flux, drying the mixture and treating it at high temperature.

It is another object of the invention to provide a process for producing cerium oxide powder by mixing a cerium source with an alkali metal compound, as flux, drying the mixture and treating it at high temperature.

It is still another object of the invention to provide a cerium oxide powder slurry prepared by crushing the cerium oxide powder and mixing it with a dispersion and distilled water.

The objects and other objects can be attained by the present invention as described hereinbelow.

To attain the objects, the present invention provides cerium oxide powder prepared by mixing a cerium source with an alkali metal compound, as flux, drying the mixture and treating it at high temperature.

The invention also provides a process for producing cerium oxide powder by mixing a cerium source with an alkali metal compound, as flux, drying the mixture and treating it at high temperature.

The cerium source may be at least one selected from the group consisting of cerium oxide, cerium hydroxide and cerium carbonate.

The alkali metal compound may be one containing Li, Na, K, Rb, Cs or Fr. Among them, at least one compound containing Na or K selected from the group consisting of inorganic or organic compounds containing Na or K, such as $KOH$, $KNO_3$, $CH_3COOK$, $K_2SO_4$, $KCl$, $KF$, $NaOH$, $NaF$, $Na_2O$, $CH_3COONa$ and $Na_2SO_4$, is preferable.

The high temperature treatment may be performed in the temperature range of 500-1200° C.

The invention further provides a cerium oxide powder slurry prepared by crushing the cerium oxide powder and mixing it with a dispersing agent and distilled water.

The dispersing agent may be at least one selected from the group consisting of polyvinyl alcohol (PVA), ethylene glycol (EG), glycerine, polyethylene glycol (PEG), polypropylene glycol (PPG), polyvinyl pyrrolidone (PVP), polyacrylate, ammonium polyacrylate and polyacryl maleate.

Hereunder is given a detailed description of the present invention.

To provide cerium oxide particles having a variety of particle size, shape and surface characteristics, the followings were determined as key components.

1) Cerium source: cerium oxide, cerium hydroxide, cerium carbonate, etc.
2) Flux: Alkali metal compound When cerium oxide is used as the cerium source, it should have a size smaller than that of the cerium oxide to be produced. Thus, cerium oxide prepared by the conventional high temperature solid state method cannot be used without processing. It should be crushed finely or prepared by the solution method, so that the cerium oxide may have a small crystal size.

Cerium oxide particles prepared by hydrothermal synthesis have unique particle size distribution and shape depending upon each synthesis condition and show crystallinity significantly different from that of other cerium salts (cerium carbonate, cerium hydroxide, cerium sulfate, cerium oxalate, and so forth).

Differently from cerium hydroxide or cerium carbonate, cerium oxide does not vaporize during high temperature treatment and has uniform, circular particle shape. Thus, it makes the optimum cerium source of the present invention in view of particle size and shape control during high temperature treatment, crushing and dispersion processes. Preferably, the hydrothermally synthesized powders have a particle size in the range of 10-500 nm.

Cerium hydroxide is much more inexpensive than hydrothermally synthesized cerium oxide and the primary particles have a small size, so that they are crystallinized at a lower temperature. Cerium carbonate can be prepared with a small cost, like cerium hydroxide, and is decomposed into small particles as carbon dioxide is emitted during high temperature treatment. Thus, it can be prepared into particles with wanted size using a flux, without regard to the particle size of the cerium source.

Each source particle is dispersed in an aqueous solution to prepare a dispersion slurry. A flux is added and the slurry is mixed uniformly. Then, it is dried using a spray dryer or a drying oven. Spray drying is advantageous in that the subsequent crushing process becomes simple as the size of the secondary particles can be controlled. And, oven drying is advantageous in that a large quantity can be dried in a short time. The preferable drying temperature is 70-200° C.

The dried powder is put in a alumina or platinum crucible having sufficient heat resistance and high-temperature stability and is high temperature treated in the temperature range of 500-1200° C. During the high temperature treatment, an oxidation atmosphere with sufficient air being fed is maintained. The crucible is kept at the treatment temperature for 1-12 hr.

Crushing dispersion can be performed by either dry crushing dispersion or wet crushing dispersion. Dry crushing dispersion can be done with a jet mill, disk mill, beads mill, etc. Wet crushing dispersion can be done with a ball mill, attrition mil, dyno mill, etc. Dry crushing dispersion is performed for coarser and larger particles and is usually done as pre-treatment of the wet crushing dispersion, which is for finer and more exact particle size control.

When an adequate amount of dispersing agent is added during wet crushing dispersion, the processing can be simplified and it may be possible to improve particle control and crushing efficiency. In the present invention, an adequate combination of the dry and wet crushing dispersions was adopted.

For the dispersing agent, such non-ionic polymers as polyvinyl alcohol (PVA), ethylene glycol (EG), glycerine, polyethylene glycol (PEG), polypropylene glycol (PPG) and polyvinyl pyrrolidone (PVP) may be used. Also, such anionic polymers as polyacrylate, ammonium polyacrylate and polyacryl maleate may be used. It is also possible to use a combination of the non-ionic and the anionic dispersing agents.

The dispersing agent is used in 0.0001-10.0 wt %, preferably in 0.02-3.0 wt %, per 100 wt % of the particles to be polished. The mixed cerium oxide slurry is titrated with 1N $KOH$ or 1N $HNO_3$ at pH 6-8. After titration, it is wet crushing dispersed with a ball mill, an attrition mill and a paint shaker.

Preferably, zirconia beads having a size of 0.05-5 mm is used for polishing. The crushing and dispersion may take a few days, but preferably it is performed for 1-24 hours. The dispersed powder is dried and crystallinity, particle size and shape are analyzed XRD and SEM.

BEST MODES FOR CARRYING OUT THE INVENTION

Hereinafter, the present invention is described further in detail through examples. However, the following examples are only for the understanding of the invention and the invention is not limited to or by them.

Example 1

Figure 6:
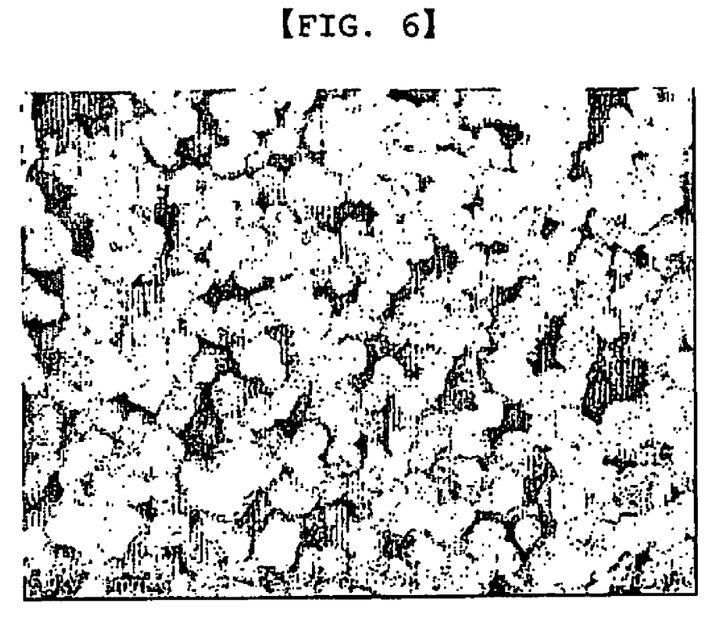
FIG. 6 is an electron micrograph of the cerium oxide powder prepared in Example 1.

0.5 g of KOH was uniformly mixed with 100 g of hydrothermally synthesized cerium oxide (type 1). High temperature treatment was performed at 700° C. for 3 hours to obtain cerium oxide powder. The resultant cerium oxide powder particle is shown in the SEM (Jeol JSM 6340F, Hitachi S-4800) micrograph of FIG. 6.

Example 2

Figure 7:
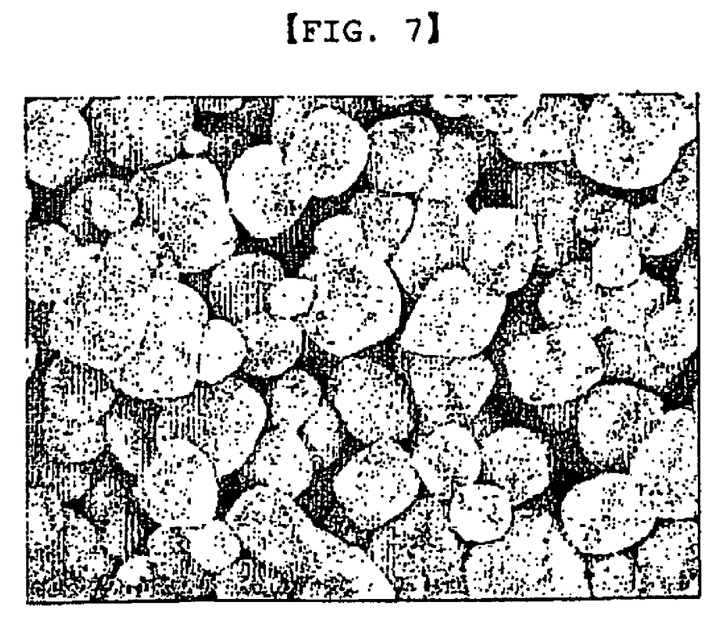
FIG. 7 is an electron micrograph of the cerium oxide powder prepared in Example 2.

0.5 g of KOH was uniformly mixed with 100 g of hydrothermally synthesized cerium oxide (type 1). High temperature treatment was performed at 900° C. for 3 hours to obtain cerium oxide powder. The resultant cerium oxide powder particle is shown in the SEM (Jeol JSM 6340F, Hitachi S-4800) micrograph of FIG. 7.

Example 3

Figure 8:
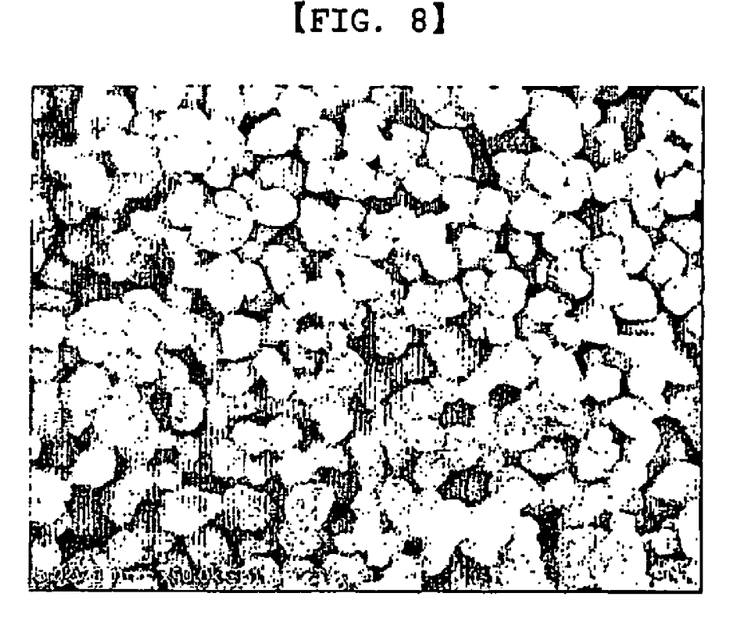
FIG. 8 is an electron micrograph of the cerium oxide powder prepared in Example 3.

2 g of KOH was uniformly mixed with 100 g of hydrothermally synthesized cerium oxide (type 1). High temperature treatment was performed at 700° C. for 3 hours to obtain cerium oxide powder. The resultant cerium oxide powder particle is shown in the SEM (Jeol JSM 6340F, Hitachi S-4800) micrograph of FIG. 8.

Example 4

Figure 9:
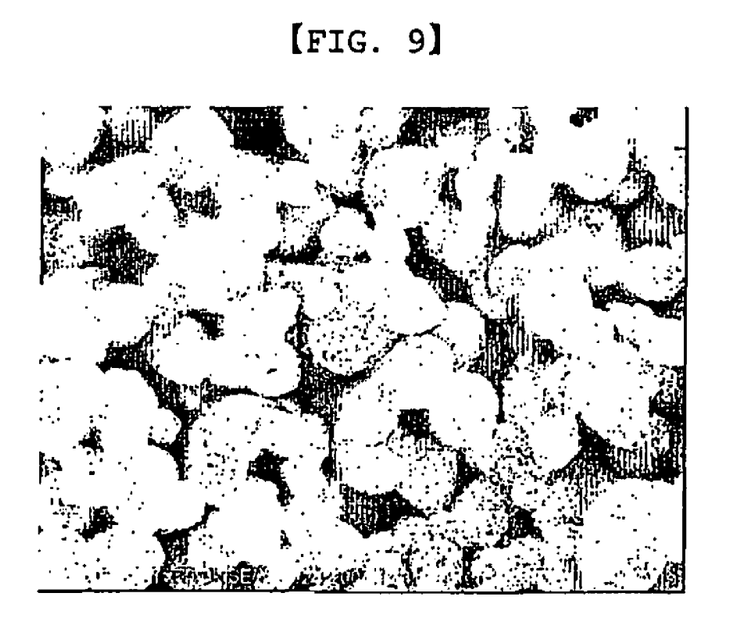
FIG. 9 is an electron micrograph of the cerium oxide powder prepared in Example 4.

2 g of KOH was uniformly mixed with 100 g of hydrothermally synthesized cerium oxide (type 1). High temperature treatment was performed at 900° C. for 3 hours to obtain cerium oxide powder. The resultant cerium oxide powder particle is shown in the SEM (Jeol JSM 6340F, Hitachi S-4800) micrograph of FIG. 9.

Example 5

1 g of $KNO_3$ was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 9.

Example 6

Figure 10:
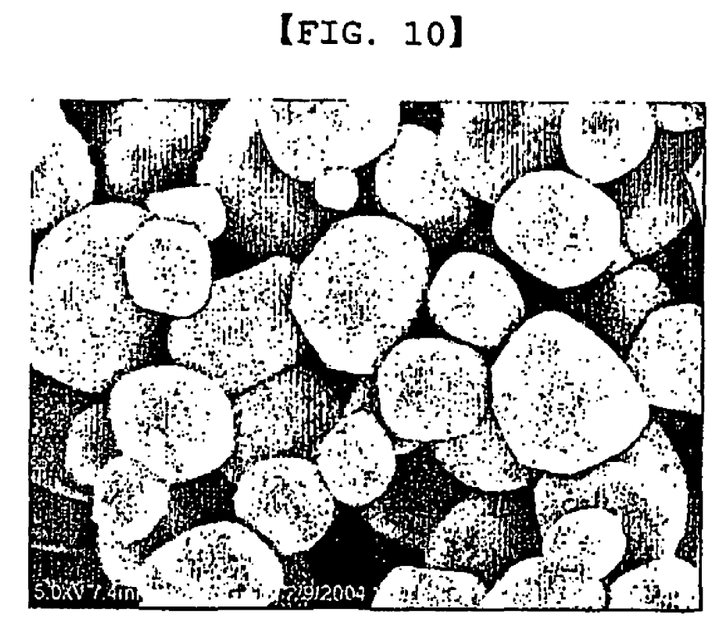
FIG. 10 is an electron micrograph of the cerium oxide powder prepared in Example 6.

5 g of $KNO_3$ was uniformly mixed with 100 g of hydrothermally synthesized cerium oxide (type 1). High temperature treatment was performed at 900° C. for 3 hours to obtain cerium oxide powder. The resultant cerium oxide powder particle is shown in the SEM (Jeol JSM 6340F, Hitachi S-4800) micrograph of FIG. 10.

Example 7

10 g of $CH_3COOK$ was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 8

2 g of $K_2SO_4$ was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 9.

Example 9

5 g of KCl was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 10

1 g of KF was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 11

0.5 g of NaOH was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 10.

Example 12

Figure 11:
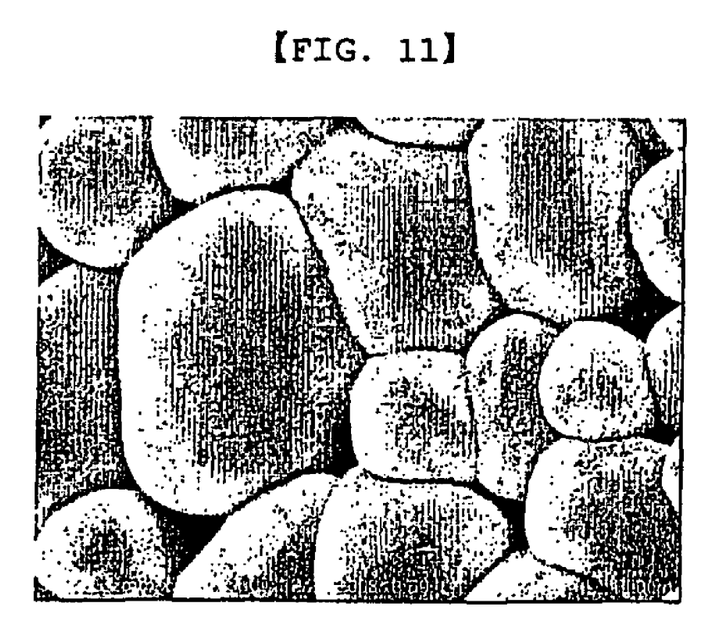
FIG. 11 is an electron micrograph of the cerium oxide powder prepared in Example 12.

2 g of NaOH was uniformly mixed with 100 g of hydrothermally synthesized cerium oxide (type 1). High temperature treatment was performed at 900° C. for 3 hours to obtain cerium oxide powder. The resultant cerium oxide powder particle is shown in the SEM (Jeol JSM 6340F, Hitachi S-4800) micrograph of FIG. 11.

Example 13

1 g of NaF was uniformly mixed with 100 g of hydrothermally synthesized cerium oxide (type 1). High temperature treatment was performed at 700° C. for 3 hours to obtain cerium oxide powder. The resultant cerium oxide powder particle was similar to the SEM (Jeol JSM 6340F, Hitachi S-4800) micrograph of FIG. 7.

Example 14

5 g of $Na_2O$ was uniformly mixed with 100 g of hydrothermally synthesized cerium oxide (type 1). High temperature treatment was performed at 600° C. for 3 hours to obtain cerium oxide powder. The resultant cerium oxide powder particle was similar to the SEM (Jeol JSM 6340F, Hitachi S-4800) micrograph of FIG. 9.

Example 15

10 g of $CH_3COONa$ was uniformly mixed with 100 g of hydrothermally synthesized cerium oxide (type 1). High temperature treatment was performed at 900° C. for 3 hours to obtain cerium oxide powder. The resultant cerium oxide powder particle was similar to the SEM (Jeol JSM 6340F, Hitachi S-4800) micrograph of FIG. 7.

Example 16

5 g of $Na_2SO_4$ was uniformly mixed with 100 g of hydrothermally synthesized cerium oxide (type 1). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 9.

Example 17

1 g of KOH was uniformly mixed with 100 g of hydrothermally synthesized cerium oxide (type 2). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 18

0.5 g of NaOH was uniformly mixed with 100 g of hydrothermally synthesized cerium oxide (type 2). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 10.

Example 19

1 g of $KNO_3$ was uniformly mixed with 100 g of hydrothermally synthesized cerium oxide (type 2). High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 20

1 g of KOH was uniformly mixed with 100 g of cerium hydroxide. High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 9.

Example 21

1 g of NaOH was uniformly mixed with 100 g of cerium hydroxide. High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 22

1 g of KOH was uniformly mixed with 100 g of cerium carbonate. High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 9.

Example 23

1 g of NaOH was uniformly mixed with 100 g of cerium carbonate. High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 7.

Example 24

1 g of $KNO_3$ was uniformly mixed with 100 g of cerium carbonate. High temperature treatment was performed at 800° C. for 3 hours to obtain cerium oxide powder. The resultant cerium oxide powder particle was similar to the SEM (Jeol JSM 6340F, Hitachi S-4800) micrograph of FIG. 9.

Example 25

20 g of the cerium oxide prepared in Example 2 was put in a sealed 500 mL polypropylene container. Dry crushing was performed with 300 g of zirconia beads (3 mm) for 3 hours using a paint shaker. The dry crushed powder was separated from the zirconia beads. 0.2 g of general-purpose polyacrylate dispersing agent (average molecular weight=4000), 200 mL of distilled water and 300 g of zirconia beads (1 mm) were mixed into the container and dispersion was performed for 3 hours using a paint shaker.

Figure 12:
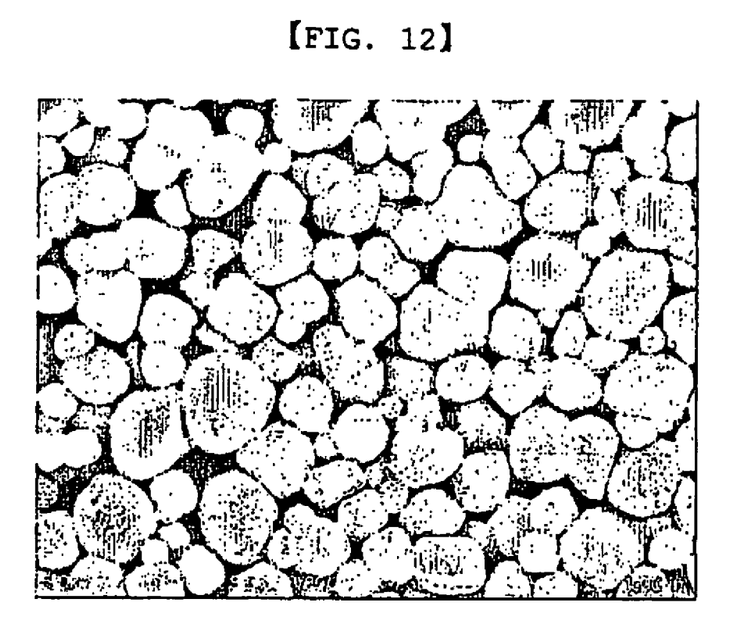
FIG. 12 is an electron micrograph of the dried cerium oxide dispersion prepared in Example 25.

The dispersed slurry was dried and analyzed by SEM (Jeol JSM 6340F, Hitachi S-4800). The result is shown in FIG. 12.

Example 26

20 g of the cerium oxide prepared in Example 4 was put in a sealed 500 mL polypropylene container. Dry crushing was performed with 300 g of zirconia beads (3 mm) for 3 hours using a paint shaker. The dry crushed powder was separated from the zirconia beads. 0.2 g of general-purpose polyacrylate dispersing agent (average molecular weight=4000), 200 mL of distilled water and 300 g of zirconia beads (1 mm) were mixed into the container and dispersion was performed for 3 hours using a paint shaker.

Figure 13:
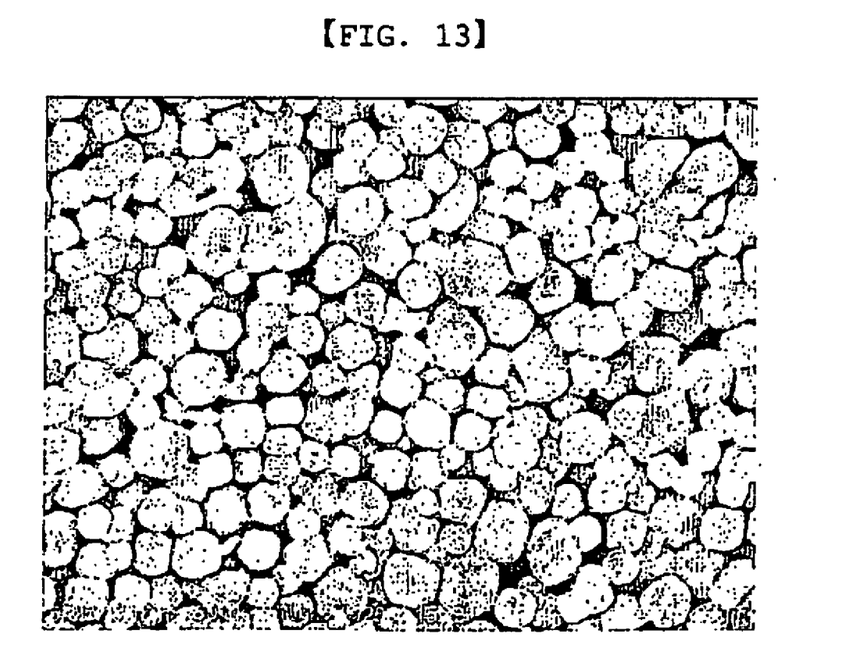
FIG. 13 is an electron micrograph of the dried cerium oxide dispersion prepared in Example 26.

The dispersed slurry was dried and analyzed by SEM (Jeol JSM 6340F, Hitachi S-4800). The result is shown in FIG. 13.

Comparative Example 1

Figure 1A:
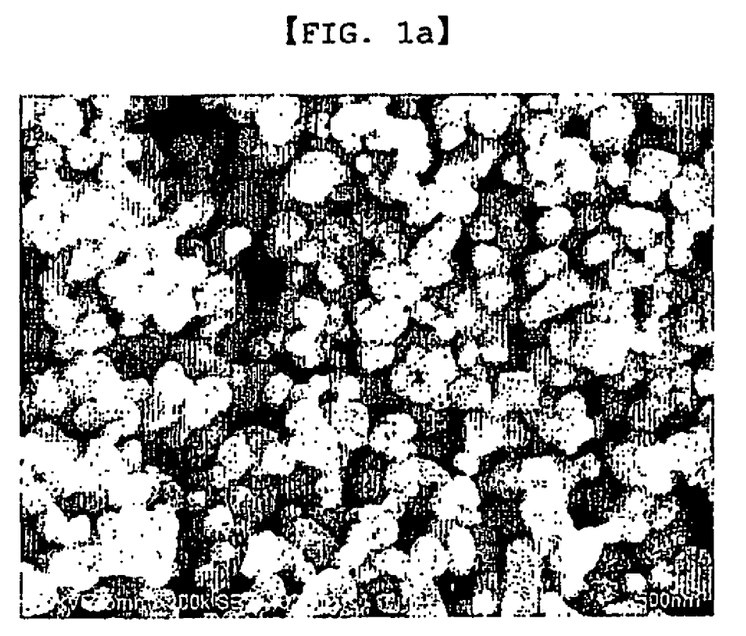
FIG. 1a is an electron micrograph of the type 1 (50 nm) hydrothermally synthesized cerium oxide.
Figure 1B:
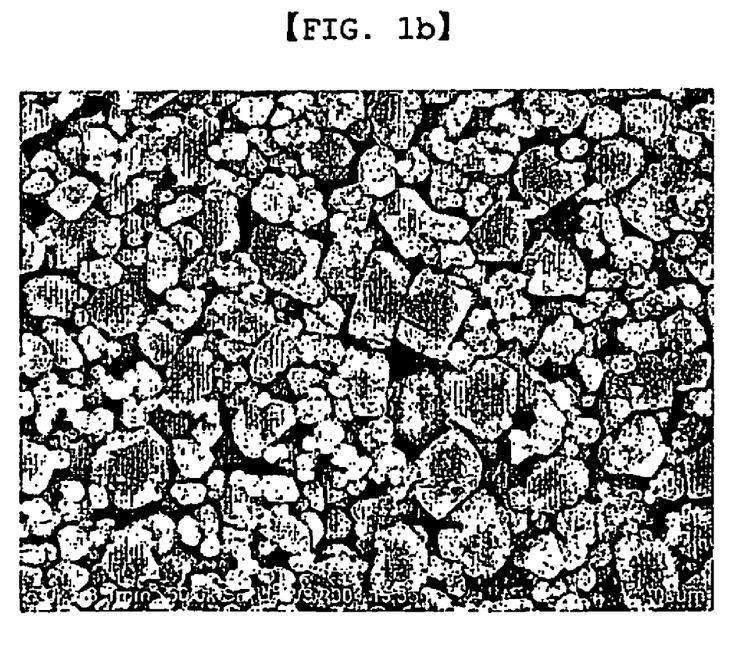
FIG. 1b is an electron micrograph of the type 2 (200 nm) hydrothermally synthesized cerium oxide.
Figure 1C:
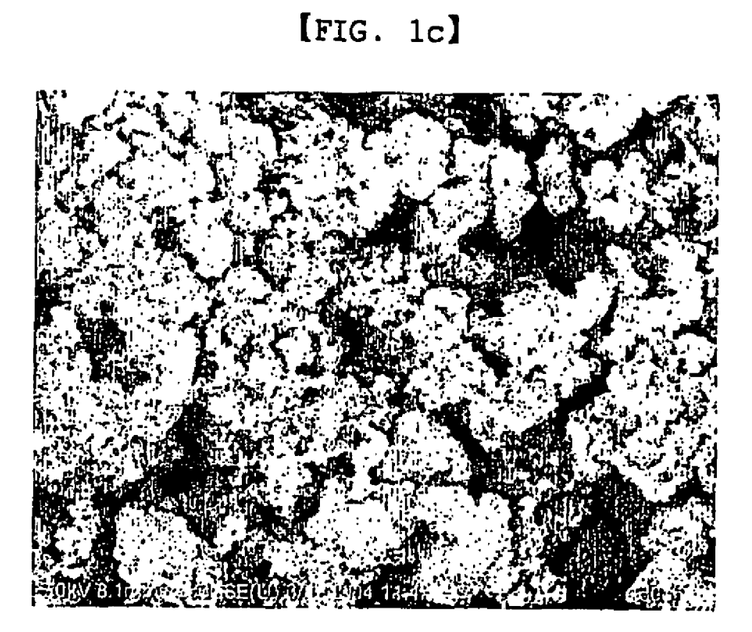
FIG. 1c is an electron micrograph of cerium hydroxide and FIG. 1d is an electron micrograph of cerium carbonate, which are used as cerium source in the present invention.
Figure 1D:
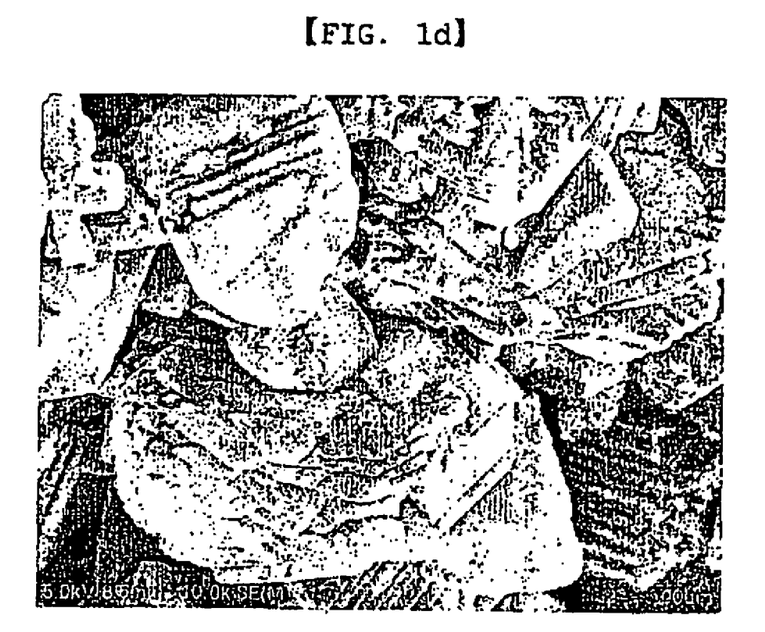
Figure 2:
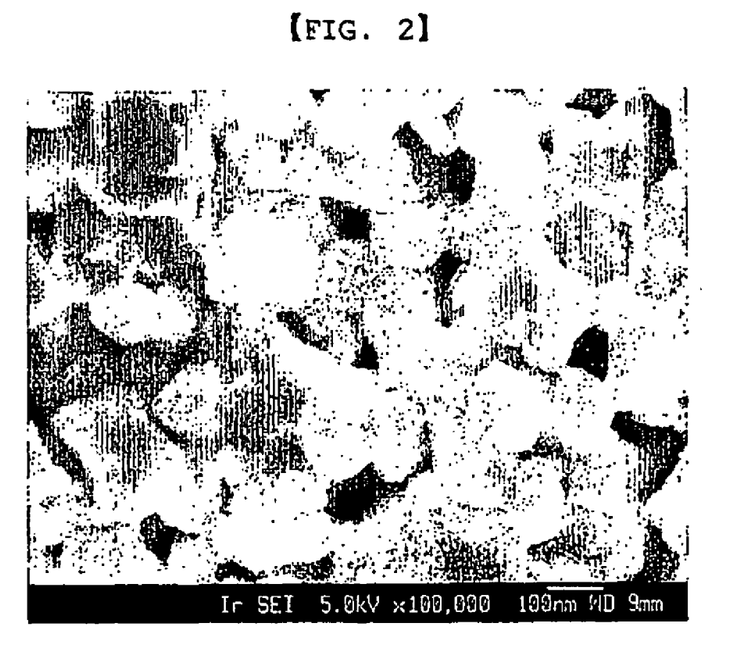
FIG. 2 is an electron micrograph of the cerium oxide powder prepared in Comparative Example 1.

Hydrothermally synthesized cerium oxide was high temperature treated at 800° C. for 3 hours to prepare cerium oxide powder. The resultant cerium oxide powder particle is shown in the SEM (Jeol JSM 6340F, Hitachi S-4800) micrograph of FIG. 2.

Comparative Example 2

Figure 3:
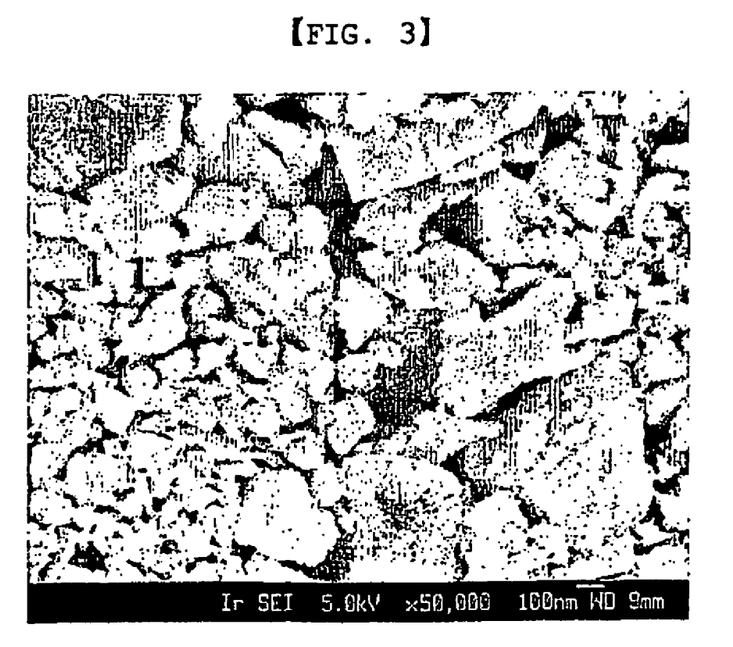
FIG. 3 is an electron micrograph of the cerium oxide powder prepared in Comparative Example 2.

Hydrothermally synthesized cerium oxide (type 1) was high temperature treated at 1000° C. for 3 hours to prepare cerium oxide powder. The resultant cerium oxide powder particle is shown in the SEM (Jeol JSM 6340F, Hitachi S-4800) micrograph of FIG. 3.

Comparative Example 3

Figure 4:
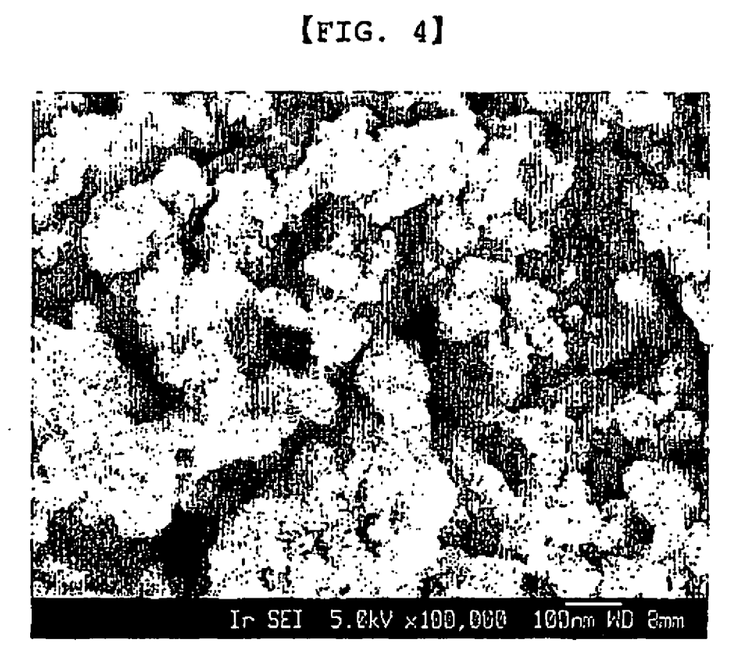
FIG. 4 is an electron micrograph of the cerium oxide powder prepared in Comparative Example 3.

Cerium hydroxide was high temperature treated at 800° C. for 3 hours to prepare cerium oxide powder. The resultant cerium oxide powder particle is shown in the SEM (Jeol JSM 6340F, Hitachi S-4800) micrograph of FIG. 4.

Comparative Example 4

Figure 5:
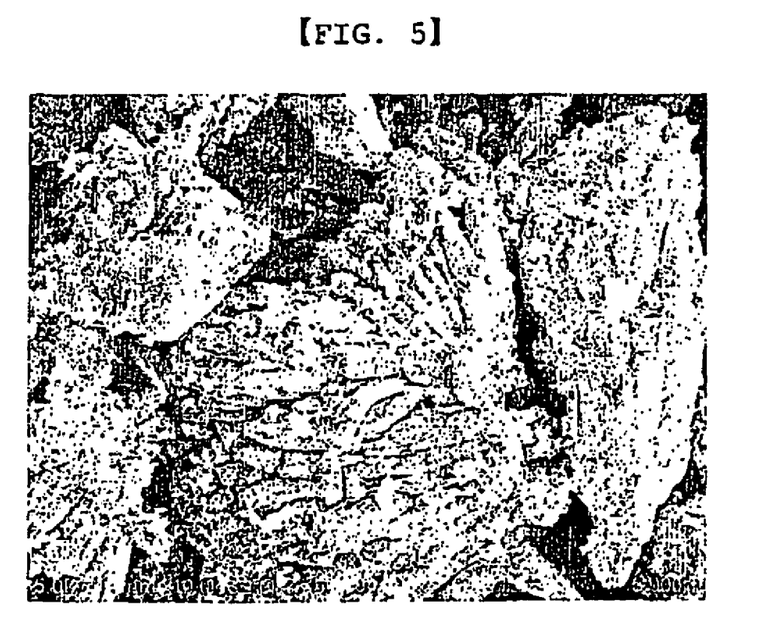
FIG. 5 is an electron micrograph of the cerium oxide powder prepared in Comparative Example 4.

Cerium carbonate was high temperature treated at 800° C. for 3 hours to prepare cerium oxide powder. The resultant cerium oxide powder particle is shown in the SEM (Jeol JSM 6340F, Hitachi S-4800) micrograph of FIG. 5.

As can be seen from the figures for the examples and comparative examples, the cerium oxide powders according to the present invention had a variety of particle size with spherical shape.

INDUSTRIAL APPLICABILITY

As apparent from the above description, cerium oxide powders having a variety of particle size while having spherical shape can be produced by high temperature treatment prior to crushing, according to the present invention.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A process for producing cerium oxide powder by:
   mixing a cerium source with an alkali metal compound as flux to form a slurry, drying the slurry to form a powder of the cerium source and the alkali metal compound, and
   high temperature treating the powder at a temperature of 600-1200° C. for 1 to 12 hours to produce cerium oxide powder having spherical shape,
   wherein the cerium source is cerium oxide prepared by hydrothermal synthesis; and
   wherein the alkali metal compound contains Na or K, and is provided in the mixture by 0.5 to 10 parts by weight of the alkali metal compound based on 100 parts by weight of the cerium source.

2. The process of claim 1, the alkali metal compound being at least one selected from the group consisting of KOH, $KNO_3$, $CH_3COOK$, $K_2SO_4$, KCl, KF, NaOH, NaF, $Na_2O$, $CH_3COONa$ and $Na_2SO_4$.

3. The process of claim 1, wherein the hydrothermally synthesized powders of cerium oxide have a particle size in the range of 10-500 nm.

* * * * *